(12) United States Patent  (10) Patent No.: US 9,235,407 B1
Ye et al.  (45) Date of Patent: Jan. 12, 2016

(54) SCOPED SETTINGS FOR A PROGRAMMING ENVIRONMENT

(71) Applicant: THE MATHWORKS, INC., Natick, MA (US)

(72) Inventors: Hong Ye, Acton, MA (US); Chandreshkumar Vora, Ashland, MA (US); Ricardo A. Losada, Marlborough, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/835,714

(22) Filed: Mar. 15, 2013

(51) Int. Cl.
*G06F 9/44* (2006.01)
*G06F 9/445* (2006.01)

(52) U.S. Cl.
CPC .... *G06F 8/67* (2013.01); *G06F 8/65* (2013.01)

(58) Field of Classification Search
None
See application file for complete search history.

(56) References Cited

U.S. PATENT DOCUMENTS

2008/0034345 A1* 2/2008 Curtis et al. .......... 717/100
2013/0111410 A1* 5/2013 Okada et al. .......... 715/841

OTHER PUBLICATIONS

Takagi, ISO/IEC JTC 1/SC 22, Programming Languages—Their environments and system software interfaces—Programming Language COBOL, Aug. 6, 2010, http://www.open-std.org/jtc1/sc22/open/ISO-IECIECJTC1-SC22_N4561_ISO_IEC_FCD_1989_information_technol.pdf, retrieved on Aug. 5, 2014.*
Vikstrom, A strudy of automatic translation of MATLAB code to C code using software from the MathWorks, Master's Thesis from Lulea University of Technology, ISSN:1402-1617 ISRN: LTU-EX--09/033--SE, http://epubl.ltu.se/1402-1617/2009/033/, accessed on Aug. 26, 2015.*

* cited by examiner

*Primary Examiner* — Wei Zhen
*Assistant Examiner* — Timothy Duncan
(74) *Attorney, Agent, or Firm* — Harrity & Harrity, LLP

(57) ABSTRACT

A device is configured to execute a first program block associated with program code, and set a first value of a scoped setting associated with the first program block, the first value of the scoped setting controlling a manner in which a first algorithm is performed during execution of the first program block. The device is configured to detect a change in scope of the program code, the change in scope including execution of a second program block that is different from the first program block, and determine a relationship between the first program block and the second program block. The device is configured to set a second value of the scoped setting based on the relationship, the second value of the scoped setting controlling a manner in which a second algorithm, identified in the second program block, is performed during execution of the second program block.

20 Claims, 11 Drawing Sheets

Scoped Settings:

Number Length (10)

Rounding (Floor)

Commands:

Add (Number Length (10))

Add (Rounding (Floor))

Remove (Rounding (Floor))

Inherit (All)

Override (Number Length (8))

Reinstate (Number Length (10))

FIG. 6

SCOPED SETTINGS FOR A PROGRAMMING ENVIRONMENT

BRIEF DESCRIPTION OF THE DRAWINGS

FIGS. 5-6 are diagrams of example implementations relating to the example process shown in FIG. 4;

DETAILED DESCRIPTION

The following detailed description of example implementations refers to the accompanying drawings. The same reference numbers in different drawings may identify the same or similar elements.

Text-based programming may include a computing environment that allows programmers (e.g., computer programmers) to create program code (e.g., computer programs) by manipulating textual program elements. Program code may include any collection of instructions that perform one or more specific tasks.

These collections of instructions may be controlled by one or more settings, which may differ in scope. Scope, as used herein, may refer to a portion of program code in which a variable is valid and can be used when the program is executed. For example, a local setting may apply to a variable that is accessible only from a program block (e.g., a project, a file, a function, a subroutine, an operation, a line of code, etc.) in which the variable is declared. A global setting may apply to a variable that is accessible throughout the entire program. Users of program code (e.g., users operating computer programs) may wish to add, delete, modify, and/or configure the settings and/or determine the scope (e.g., the portion of program code) to which the settings apply. Implementations described herein may allow a user to determine, control, and/or configure scoped settings for different program blocks in the program code.

Figure 1:
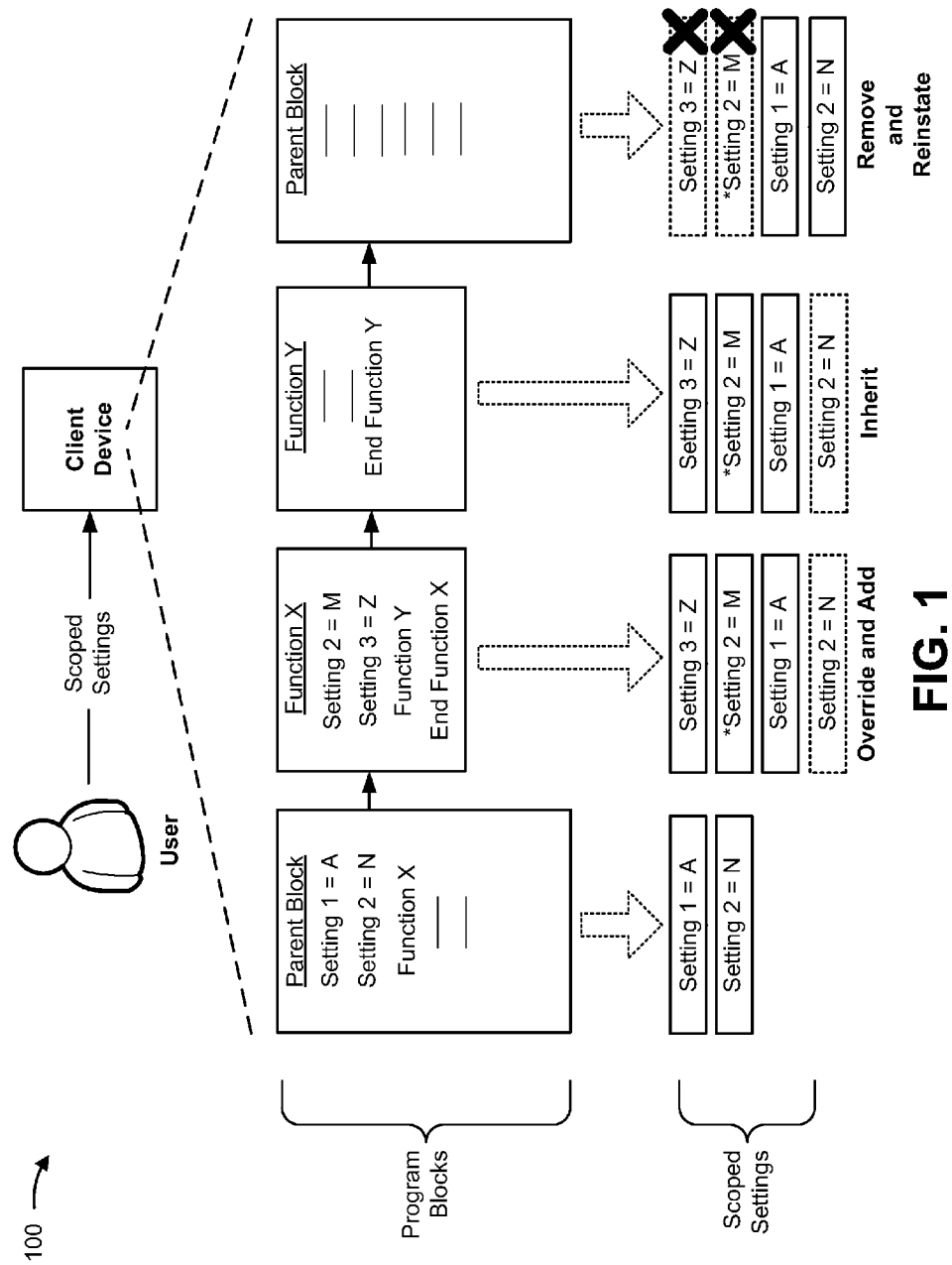
FIG. 1 is a diagram of an overview of an example implementation described herein.

FIG. 1 is a diagram of an overview of an example implementation 100 described herein. As shown in FIG. 1, example implementation 100 may include a client device, a series of program blocks, and a set of scoped settings associated with the program blocks. The client device may allow a user to modify the scoped settings within one or more program blocks associated with program code.

As shown in FIG. 1, the program blocks may include a parent block. The parent block may include a first setting (e.g., "Setting 1"), a second setting (e.g., "Setting 2"), and a first function call (e.g., a call to "Function X). In addition, execution of the program code in the parent block may be controlled by two scoped settings that define values for the first setting and the second setting (e.g., "Setting 1=A" and "Setting 2=N"). The two scoped settings may apply to the entire parent block.

As further shown in FIG. 1, the client device may override and/or add scoped settings to a program block that corresponds to a first function (e.g., "Function X"), when the first function is called (e.g., by the parent block). For example, the client device may override the second setting (e.g., changing from "Setting 2=N" to "Setting 2=M"), may add a third setting (e.g., "Setting 3=Z"), and may inherit the first setting (e.g., "Setting 1=A"). These scoped settings may control execution of program code in the first function (e.g., "Function X"). When the client device overrides a setting, as indicated by an asterisk (*) in FIG. 1, the previous setting (e.g., "Setting 2=N") may be stored, and may be reinstated later (e.g., when the client device finishes executing Function X).

As further shown in FIG. 1, a program block corresponding to the second function (e.g., "Function Y") may be called by the first function (e.g., "Function X"), and may inherit scoped settings from the first function. Thus, the scoped settings, including the first setting (e.g., "Setting 1=A"), the second setting (e.g., "Setting 2=M"), and the third setting (e.g., "Setting 3=Z"), may remain the same for the second function (e.g., "Function Y"). When execution of the second function (e.g., "Function Y") ends, control may be returned to the first function (e.g., "Function X"), which may also end. Based on the first and second functions finishing execution, the inherited, overridden, and/or added scoped settings may be removed, and the value (e.g., "N") originally associated with the second setting may be reinstated (e.g., the second setting may change from "Setting 2=M" back to the original value, "Setting 2=N"). Implementations described herein may allow greater flexibility and operability of program code by allowing a client device to determine and configure scoped settings for one or more program blocks of program code.

Figure 2:
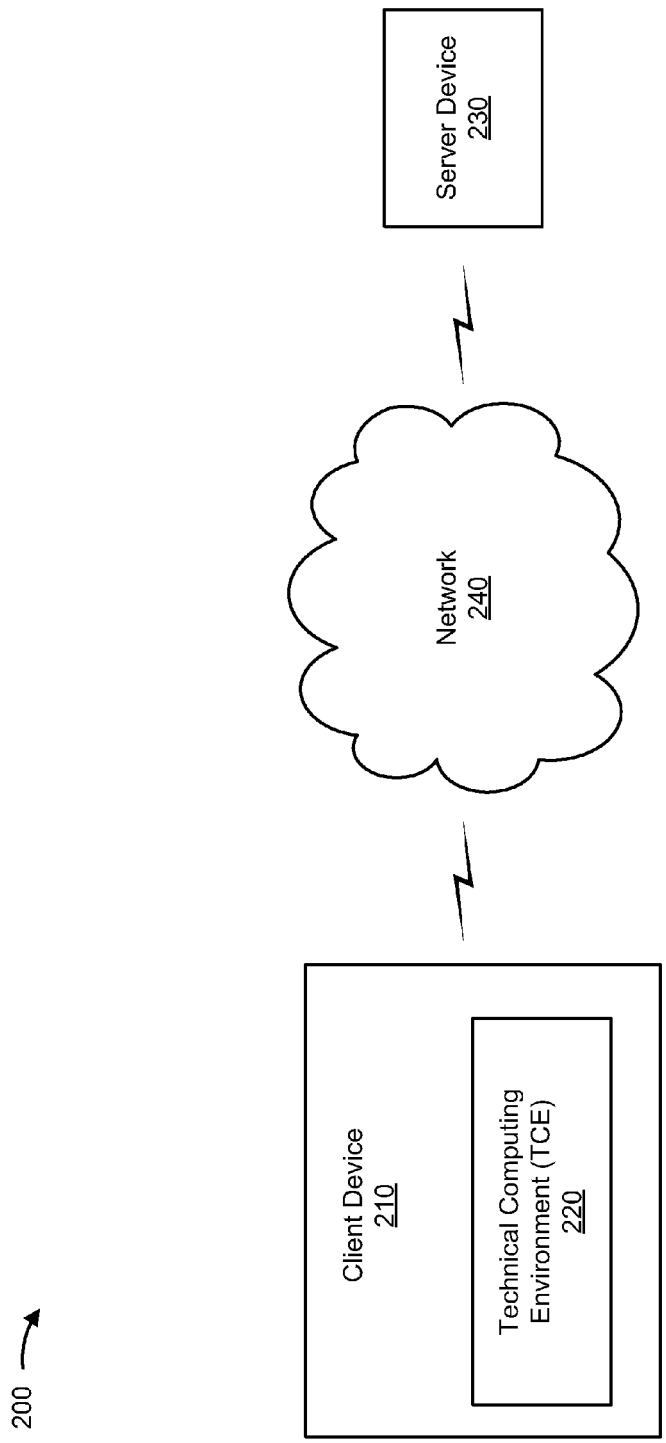
FIG. 2 is a diagram of an example environment in which systems and/or methods described herein may be implemented.

FIG. 2 is diagram of an example environment 200 in which systems and/or methods described herein may be implemented. As shown in FIG. 2, environment 200 may include a client device 210, which may include a technical computing environment (TCE) 220. Furthermore, environment 200 may include a server device 230 and a network 240. Devices of environment 200 may interconnect via wired connections, wireless connections, or a combination of wired and wireless connections.

Client device 210 may include a device capable of controlling and configuring scoped settings in a programming environment. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., information associated with program blocks and/or scoped settings).

Client device 210 may host TCE 220. TCE 220 may include any hardware-based logic and/or a combination of hardware-based logic or software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

Server device 230 may include one or more devices capable of receiving, storing, processing, and/or transmitting information, such as information identifying one or more program blocks and/or scoped settings in program code. For example, server device 230 may include a computing device, such as a server, a desktop computer, a laptop computer, a tablet computer, a handheld computer, or a similar device. In some implementations, server device 230 may receive information from and/or transmit information to client device 210.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
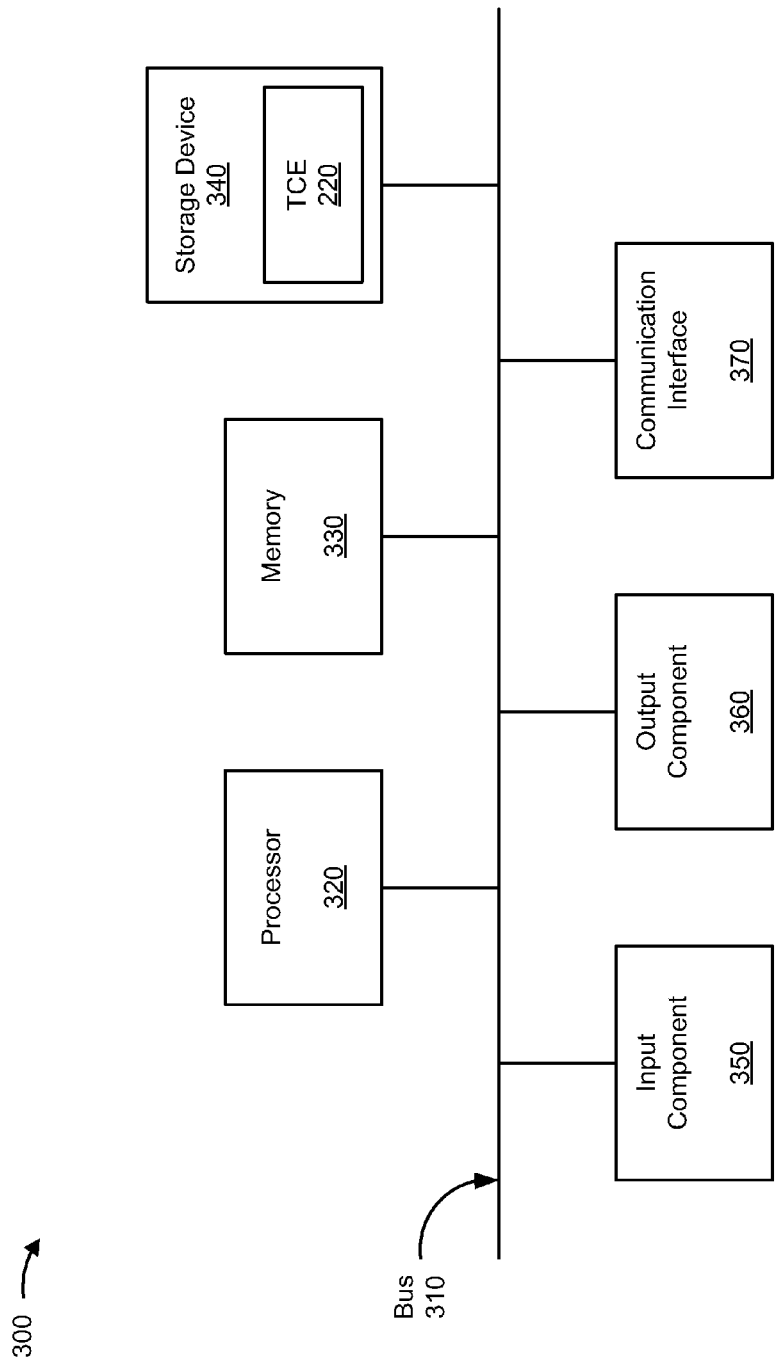
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
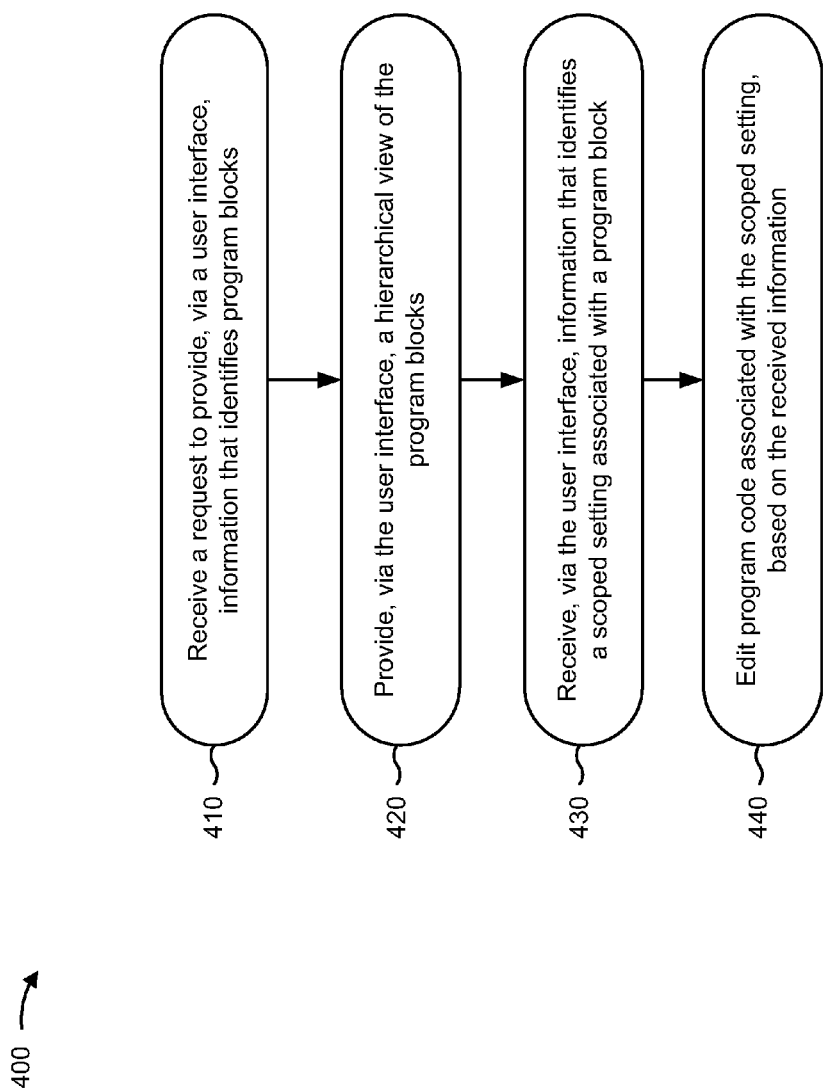
FIG. 4 is a flow chart of an example process for viewing and/or modifying program blocks associated with scoped settings.

FIG. 4 is a flow chart of an example process 400 for viewing and/or modifying program blocks associated with scoped settings. In some implementations, one or more process blocks of FIG. 4 may be performed by client device 210. Additionally, or alternatively, one or more process blocks may be performed by another device or group of devices separate from or including client device 210, such as server device 230.

As shown in FIG. 4, process 400 may include receiving a request to provide, via a user interface, information that identifies program blocks (block 410). For example, client device 210 may receive a request, from a user (e.g., a user of client device 210) to provide information that identifies one or more program blocks in the program code. As used herein, program code may refer to any collection of programming instructions that perform one or more specific tasks. A program block may refer to the entire program code or any subset of program code that includes a sequence (e.g., a block) of programming instructions that perform a specific task. For example, the program block may include program code corresponding to a project, a file, a function, a subroutine, a code section, an operation, a line of code, or the like.

In some implementations, the program blocks may be identified by a user. For example, the user may provide information that identifies program blocks by use of a graphical user interface ("GUI"). The program blocks may be displayed on the GUI along with attributes and/or settings associated with the program blocks. The user may select one or more program blocks and/or may edit one or more program blocks using the GUI. The GUI may be displayed on client device 210.

As further shown in FIG. 4, process 400 may include providing, via the user interface, a hierarchical view of the program blocks (block 420). For example, client device 210 may provide a hierarchical view of the program blocks on the user interface (e.g., a user interface associated with client device 210). The hierarchical view may include program blocks arranged in order based on relative degree, scale, step, class, type, etc.

In some implementations, the hierarchical view may include program blocks arranged according to parent-child relationships among the program blocks. For example, the hierarchical view may show a program block associated with a file (e.g., a parent program block) and any program blocks associated with one or more functions included in the file (e.g., one or more child program blocks). Additionally, or alternatively, the hierarchical view may show a program block associated with a parent function (e.g., a parent program block) and any program blocks associated with child functions (e.g., sub-functions) that are executed during execution of the parent function and before the parent functions ends execution.

In some implementations, the hierarchical view may be represented graphically. For example, the hierarchical view may be represented as a diagram, a tree structure, a flow chart, a graph, or the like. In some implementations, the tree structure may include one or more linked nodes arranged according to a hierarchy, with parent nodes, child nodes, grandchild nodes, or the like. For example, the parent node (e.g., the parent program block) may correspond to a project, the child node (e.g., the child program block) may correspond to a file, the grandchild node (e.g., the grandchild program block) may correspond to a function, and so forth.

As further shown in FIG. 4, process 400 may include receiving, via the user interface, information that identifies a scoped setting associated with the program block (block 430). For example, client device 210 may receive information from a user (e.g., a user of client device 210) that identifies a scoped setting. The scoped setting may control the manner in which a device, executing program code controlled by the scoped setting (e.g., a local scoped setting, a global scoped setting, etc.), executes an algorithm described in the program code. The scoped setting may include a value (e.g., a letter, a number, a character, a word, etc.) that defines how the scoped setting is to operate. In some implementations, client device 210 may set scoped settings that apply locally (e.g., to a program block) and/or globally (e.g., to the entire program code). For example, the scoped setting may apply to a project, a file, a function, a subroutine, a code section, an operation, a line of code, or the like.

In some implementations, the scoped setting may be identified by a line of code that sets a value for the scoped setting. For example, a program block associated with a function may include a line of code that defines a scoped setting. The scoped setting may define how numbers output by the function are to be rounded (e.g., a rounding scoped setting). The program block may include lines of code that define the scope of the value (e.g., that defines the program blocks to which the scoped setting is to be applied).

In some implementations, the scoped setting, and/or the extent of their application to program blocks, may be identified by a command (e.g., an order in the program code to perform a specific task). For example, a program block may include a command to add a new scoped setting. During execution, the new scoped setting may be applied to the program block. After the program block is executed (e.g., after a function identified in the program block is executed, after an operation identified in the program block is executed, etc.) the scoped setting may no longer apply. Additionally, or alternatively, the program block may include a command to remove a current scoped setting. In this instance, during execution, the current scoped setting may not be applied to the program block.

In some implementations, the program block may include a command to inherit a scoped setting. For example, a current program block may include a command to inherit a previous scoped setting from a previous program block. In some implementations, the previous program block may be a parent program block of the current program block. Additionally, or alternatively, the previous program block may be a sibling of the current program block, and/or a child of the current program block.

In some implementations, the program block may include a command to override a current scoped setting. For example, a first program block may include a scoped setting that includes a first scoped value. A second program block may include a command to override (e.g., change) the first scoped value associated with the scoped setting to a second scoped value. During execution, the second scoped value may apply to the second program block. Additionally, or alternatively, the program block may include a command to reinstate a value associated with a scoped setting. For example, a third program block may include a command to reinstate the first scoped value associated with the first program block. During execution, the first scoped value may be reinstated, and may apply to the third program block. In some implementations, the third program block may be the same as the first program block. In this instance, the execution of the program code may return to the parent block (e.g., the first program block) after executing the child program block (e.g., the second program block), and may reinstate the first scoped value from the first program block.

In some implementations, the scoped settings may apply to various program blocks based on the relationship between the program blocks. For example, a child program block may automatically (e.g., without being identified by a program code command) inherit a scoped setting from a parent program block based on the relationship between the blocks (e.g., based on the child program block being a child of the parent program block). Additionally, or alternatively, a scoped setting added to a child program block may be removed automatically when executing the child program block ends. In some implementations, a child block may include a scoped value that overrides a parent scoped value. In this instance, the parent scoped value may be reinstated automatically when the child program block finishes executing and the parent program block continues executing.

In some implementations, the scoped settings may be displayed in a hierarchy associated with a hierarchy of program blocks. The hierarchy may demonstrate how the scoped settings apply to the program blocks. For example, client device 210 may provide a hierarchical view of project scoped settings (e.g., settings that apply to a project), file scoped settings (e.g. settings that apply to a file), function scoped settings (e.g., settings that apply to a function), code section scoped settings (e.g., settings that apply to a code section), operation scoped settings (e.g., settings that apply to an operation), or the like. In this manner, the hierarchical view may demonstrate how the scoped settings relate (e.g., which scoped settings apply to which blocks of program code).

As further shown in FIG. 4, process 400 may include editing program code associated with the scoped setting, based on the received information (block 440). For example, client device 210 may edit program code associated with a scoped setting based on receiving input from a user (e.g., a user of client device 210). In some implementations, client device 210 may modify existing program code to change a value of the scoped setting when the program code is executed. Additionally, or alternatively, client device 210 may add program code to change a value of the scoped setting when the program code is executed.

In some implementations, the user may view (e.g., in a hierarchy) program blocks and associated scoped settings. The user may edit program code based on the view. For example, the user may view a particular scoped setting associated with a particular program block and may edit a value associated with the scoped setting. Additionally, or alternatively, the user may view a particular scoped setting and define the extent of the scoped setting's application (e.g., the user may define the program blocks to which the scoped setting applies).

In this manner, a user may view a hierarchy of program blocks, select a program block, and view scoped settings and values associated with the selected program block. The user may edit (e.g., add, remove, modify, etc.) a scoped setting and/or a value associated with the selected program block. The edit may cause client device 210 to insert program code that, when executed, causes the values for the scoped settings to apply to the selected program block.

While a series of blocks has been described with regard to FIG. 4, the blocks and/or the order of the blocks may be modified in some implementations. Additionally, or alternatively, non-dependent blocks may be performed in parallel.

Figure 5:
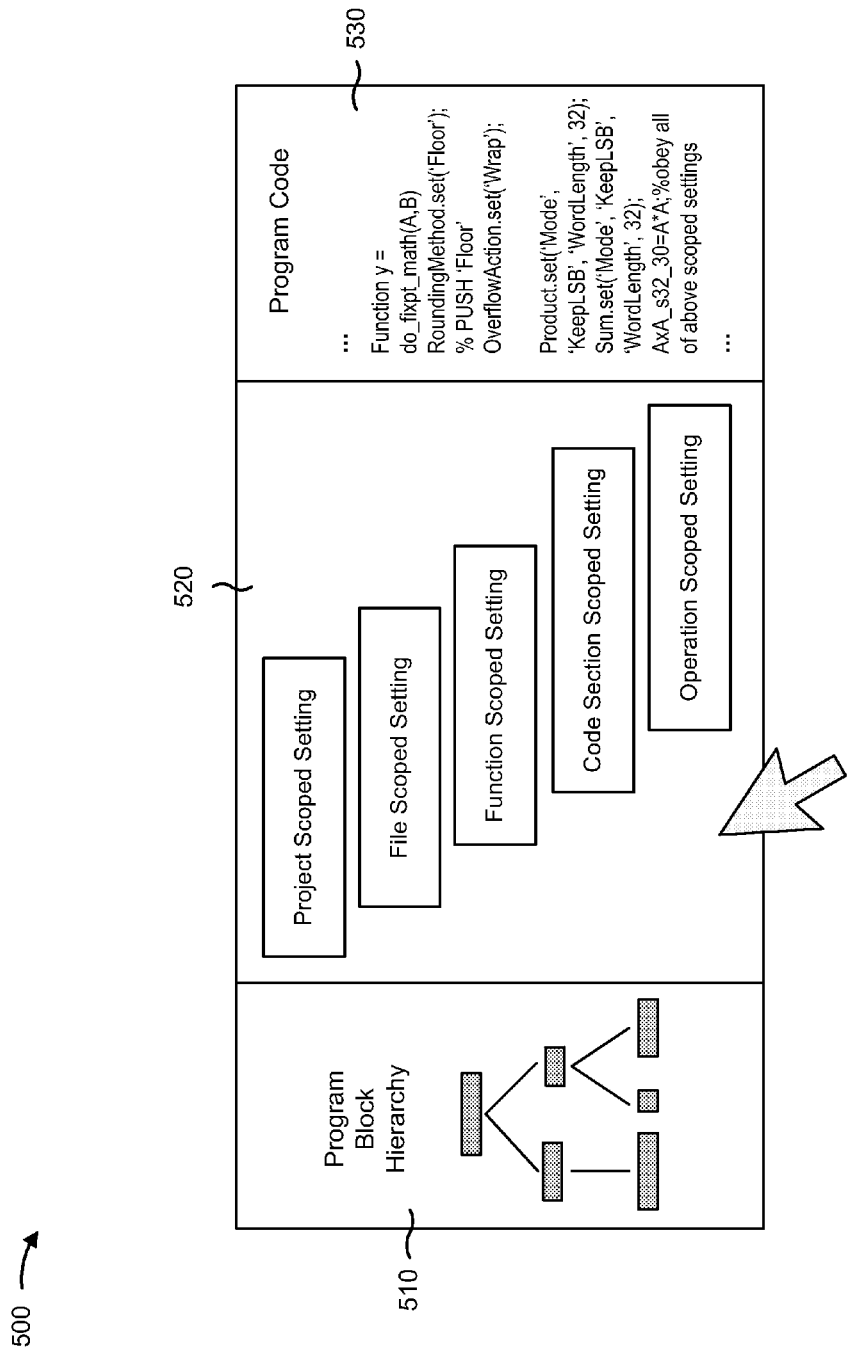

FIG. 5 is a diagram of an example implementation 500 relating to example process 400 shown in FIG. 4. In example implementation 500, client device 210 may receive user input via a user interface, such as a GUI.

As shown by reference number 510, client device 210 may display a hierarchy of program blocks. For example, client device 210 may display a parent program block, one or more child program blocks, one or more grandchild program blocks, etc. In some implementations, a user (e.g., a user of client device 210) may select a particular program block in the hierarchy. Information associated with the selected program block, such as scoped settings associated with the selected program block (e.g., reference number 520) and/or program code associated with the selected program block (e.g., reference number 530), may be displayed on the user interface.

As shown by reference number 520, client device 210 may display a hierarchy of scoped settings associated with the program blocks. For example, client device 210 may display scoped settings and/or values associated with the selected program block.

In some implementations, the scoped settings may be displayed in a hierarchical view. For example, the hierarchical view may include a scoped setting that applies to the entire project (e.g., "Project Scoped Setting"), a scoped setting that applies to a file in the project (e.g., "File Scoped Setting"), a scoped setting that applies to a function in the file (e.g., "Function Scoped Setting"), a scoped setting that applies to a code section in the function (e.g., "Code Section Scoped Setting"), and/or a scoped setting that applies to an operation in the code section (e.g., "Operation Scoped Setting"). The scoped settings may be displayed in descending order, with scoped settings that apply to a greater quantity of code and/or a higher level in the hierarchy being toward the top of the GUI, and scoped settings that apply to a lesser quantity of code and/or a lower level in the hierarchy being toward the bottom of the GUI.

In some implementations, the user may select a scoped setting associated with the selected program block. The user may edit the scoped setting by changing a value associated with the scoped setting. Additionally, or alternatively, the user may add and/or remove a scoped setting. In some implementations, changes to scoped settings and/or values may cause client device 210 to change a portion of the program code. Changes to the program code may be displayed on the user interface (e.g., reference number 530).

As shown by reference number 530, client device 210 may display program code associated with the selected program block. In some implementations, client device 210 may display program code that has been edited. For example, the user may change scoped settings via the user interface. Client device 210 may display the changes to the program code. The portion of the program code corresponding to a program block (e.g., a project, a file, a function, a code section, an operation, etc.) may be noted (e.g., with bold text, italicized text, highlighted text, text of a different color, etc.). Additionally, or alternatively, the user may edit the program code directly. Changes to the program code associated with changes to the scoped settings may be displayed in the hierarchy of scoped settings (e.g., reference number 520). By displaying the edited program code, client device 210 may allow a user (e.g., a user of client device 210) to see how changes to the scoped settings will be reflected in program code and/or in the hierarchical view.

FIG. 6 is a diagram of an example implementation 600 relating to example process 400 shown in FIG. 4. Implementation 600 shows example program code commands that may be used to set values for scoped settings.

As shown by reference number 610, the program code may include a first scoped setting (e.g., "Number Length") and a second scoped setting (e.g., "Rounding"). The first and second scoped settings may apply to a function associated with a program block that computes mathematical operations using numbers. The first scoped setting may include a value (e.g., "10") that defines a maximum number length (e.g., that a number is not to exceed 10 digits) for mathematical operations that apply the first scoped setting. The second scoped setting may include a value (e.g., "Floor") that specifies that a number with more digits than the maximum number length is to be rounded down for mathematical operations that apply the second scoped setting.

As shown by reference number 620, the program code may include commands defining how the scoped settings should be applied to program blocks as the program code executes. In some implementations, the scoped settings and associated values may be added to a stack as the program code executes. Scoped settings in the stack may apply to program blocks in the program code.

In some implementations, the commands may include a command that defines a new scoped setting to be applied to the program block. For example, a first add command (e.g., "Add (Number Length (10))") may apply the first scoped setting and the associated value to the program block, and a second add command (e.g., "Add (Rounding (Floor))") may apply the second scoped setting and the associated value to the program block. Additionally, or alternatively, the commands may include a command that stops a scoped setting from applying to a program block. For example, a remove command (e.g., "Remove (Rounding (Floor))") may remove the second scoped setting and the value from being applied to the program block. Additionally, or alternatively, the commands may include a command that inherits one or more scoped settings from a previous program block. For example, an inherit command (e.g., "Inherit (All)") may apply all of the scoped settings and associated values from the previous program block to a current program block.

In some implementations, the commands may include a command that overrides a scoped setting (e.g., that changes a value associated with a scoped setting). For example, an override command (e.g., "Override (Number Length (8))") may change a first value (e.g., "10") associated with the first scoped setting (e.g., "Number Length (10)") to a new value (e.g., "8"). Additionally, or alternatively, the commands may include a command that reinstates a previous scoped setting (e.g., that changes a value associated with a scoped setting to a previous value associated with the scoped setting). For example, a reinstate command (e.g., "Reinstate (Number Length (10))") may change the new value (e.g., "8") back to the previous value (e.g. "10").

In this manner, the scoped settings may be identified by the use of lines of code (e.g., scoped settings and commands).

Figure 7:
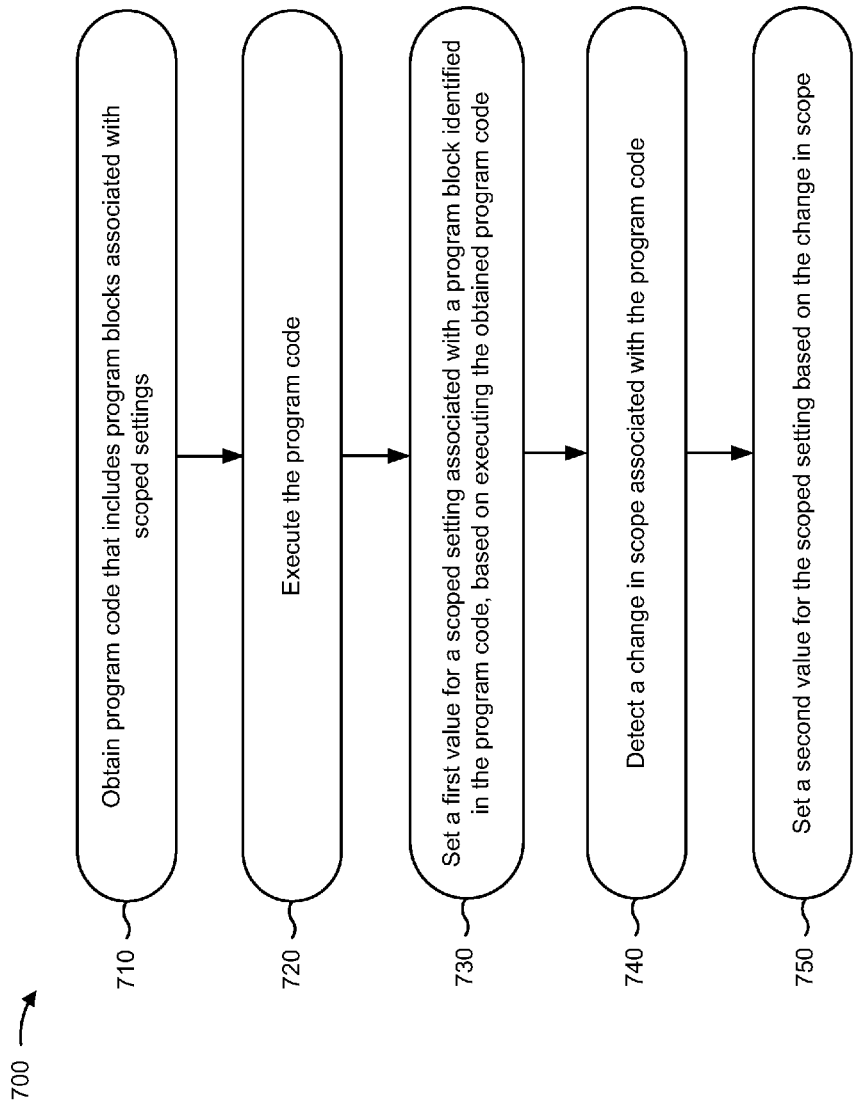
FIG. 7 is a flow chart of an example process for controlling scoped settings in a programming environment.

FIG. 7 is a flow chart of an example process 700 for controlling scoped settings in a programming environment. In some implementations, one or more process blocks of FIG. 7 may be performed by client device 210. Additionally, or alternatively, one or more process blocks of FIG. 7 may be performed by another device or group of devices separate from or including client device 210, such as server device 230.

As shown in FIG. 7, process 700 may include obtaining program code that includes program blocks associated with scoped settings (block 710), and executing the program code (block 720). For example, client device 210 may obtain program code from memory and/or from another device (e.g., server device 230). In some implementations, the program code may have been edited by a user (e.g., a user of client device 210). For example, the scoped settings may be set by a user via process 400, described in FIG. 4. Client device 210 may execute the program code including the program blocks and the scoped settings. Executing the program code may include carrying out the instructions identified in the program code. Client device 210 may execute program blocks associated with program code.

As further shown in FIG. 7, process 700 may include setting a first value for a scoped setting associated with a program block identified in the program code, based on executing the obtained program code (block 730). For example, client device 210 may set the first value for the scoped setting associated with a program being executed.

The scoped setting may include a data type override setting (e.g., a setting that overrides fixed-point data types with floating-point data types), an execution mode setting (e.g., a setting that defines a speed at which client device 210 executes program code), and/or a refresh rate setting (e.g., a setting that controls how frequently client device 210 displays information). In some implementations, the scoped setting may include a setting that relates to an array of information, such as a distribution of values across a range (e.g., a histogram), and/or information acquired during an interval of time (e.g., data logging). For example, the scoped setting may include a setting that defines a maximum and/or a minimum (e.g., a histogram maximum and/or minimum setting), and/or a setting that defines a decimation factor (e.g., a setting that reduces the sampling rate of a signal). In some implementations, the scoped setting may control one or more settings in a block-modeling environment, such as color, zoom, transparency, font, or the like.

In some implementations, the scoped setting may control a fixed-point mathematical operation (e.g., fixed-point arithmetic). A fixed-point mathematical operation may include an operation involving a real data type for a number that has a fixed quantity of digits after the binary point and/or decimal point. The binary point and/or decimal point may include a symbol used to separate an integer part of the number from a fractional part of the number. For example, a number, such as a number representing a quantity of money (e.g., $10.00) may have a fixed quantity of digits after the decimal point (e.g., two digits). Any number with greater than the fixed quantity of digits (e.g., greater than two digits) may be rounded in some way. The scoped setting may control a manner in which the rounding is performed by a device (e.g., a ceiling value, a floor value, a nearest value, a round value, etc.). Additionally, or alternatively, the scoped setting may apply to other settings instead of and/or in addition to fixed-point mathematical operations, such as rational math operations, floating point math operations, or the like.

In some implementations, performing operations (e.g., addition, subtraction, multiplication, division, etc.) involving fixed-point numbers may include defining a word length scoped setting, a fraction length scoped setting, a signedness scoped setting, a rounding scoped setting, an overflow scoped setting, a return type scoped setting, or the like. In some implementations, the word length setting, the fraction length setting, and/or the signedness setting may apply to a summation operation (e.g., sum) and/or a multiplication operation (e.g., product). The word length scoped setting may define a total length (e.g., a quantity of numerals) of the fixed-point numbers. The fraction length scoped setting may define a quantity (e.g., a quantity of numerals) after a binary point of the fixed-point number. The signedness scoped setting may specify whether a number includes a sign or not (e.g., a signed or an unsigned value).

The return type scoped setting may specify a data type for a return value of a math operation. For example, when a math operation is performed using numbers with different data type (e.g., a fixed point number and a floating point number), the return type scoped setting may specify a data type for the return value generated via the math operation. For example, the return type scoped setting return a fixed point value (e.g., based on the setting specifying a propagateFixed value) or a floating point value (e.g., based on the setting specifying a propagateFloat value).

The rounding scoped setting may specify whether the fixed-point number is to be rounded up (e.g., a ceiling value), rounded down (e.g., a floor value), rounded to a nearest number (e.g., a nearest value), etc. after an operation. The overflow scoped setting may define how fixed-point numbers outside of a range of numbers may be handled. For example, client device 210 may be limited (e.g., by the word length scoped setting and/or fraction length scoped setting) to representing a finite range of numbers (e.g., −1 to 1). When an operation generates a resulting value that is outside of the finite range of numbers (e.g., 1.5), the overflow setting may define whether to return a saturated value (e.g., a saturate value) representing the closest value, to the resulting value, included in the finite range of numbers (e.g. 1) and/or whether to return a wrapped value (e.g., a wrap value) representing a number generated by returning to a minimum of the finite range of numbers and continuing the arithmetic operation (e.g., adding the extra 0.5 to −1 resulting in −0.5).

For example, a function (e.g., a fixed-point function) may be set to operate on fixed-point numbers representing monetary values (e.g., $100.00). The fixed-point function may execute based on a word length scoped setting (e.g., 5), a fraction length scoped setting (e.g., 2), a rounding scoped setting (e.g. floor, ceiling), and/or an overflow scoped setting (e.g., saturate, wrap). When the fixed-point function returns a value (e.g., $132.407) that is greater than the scoped setting fraction length (e.g., that includes three numerals after the binary point instead of two), the number may be rounded up (e.g., $132.41) if the rounding scoped setting specifies to round up (e.g., ceiling), or may be rounded down (e.g., $132.40) if the rounding scoped setting specifies to round down (e.g., floor). When the fixed-point function returns a value (e.g., $1050.00) that is greater than the word length scoped setting (e.g., that includes six total numerals instead of five total numerals), the number may be saturated (e.g., $999.99) if the overflow scoped setting specifies to saturate, or may be wrapped (e.g. −$050.00) if the overflow scoped setting specifies to wrap.

As further shown in FIG. 7, process 700 may include detecting a change in scope associated with the program code (block 740). For example, client device 210 may execute the program code, and may detect that a program block being executed includes scoped settings that are different from a previously executed program block. Client device 210 may detect a change from execution of a first program block to execution of a second program block. Additionally, or alternatively, client device 210 may detect a change in scope when the program code is executed that changes a setting and/or a value of the setting. For example, client device 210 may execute program code, and may detect that a scoped setting and/or a value that applies to a first program block is not to be applied to a subsequent program block (e.g., that a scope and/or the value of the scoped setting has changed).

In some implementations, client device 210 may detect a change in scope associated with program code by comparing one or more scoped settings. For example, a first function (e.g., a first fixed-point function) associated with a first program block may include a first scoped setting (e.g., a wrap scoped setting). The first scoped setting may specify a manner in which client device 210 is to perform an operation described by the first function. For example, the first scoped setting may specify that the rounding of a fixed-point arithmetic is to wrap when values are outside of the number associated with a word length associated with the first function. A second function (e.g., a second fixed-point function) associated with a second program block may include a second scoped setting (e.g., a saturation scoped setting). The second scoped setting may specify a manner in which client device 210 is to perform an operation described by the second function. For example, the second scoped setting may specify that the overflow action of a fixed-point arithmetic is to saturate when values are outside of the number associated with a word length associated with the first function. Client device 210 may determine that the first scoped setting (e.g., the wrap scoped setting) is different from the second scoped setting (e.g., the saturate scoped setting). Based on this determination, client device 210 may detect that the scope associated with the program code has changed between the first function and the second function.

As further shown in FIG. 7, process 700 may include setting a second value for the scoped setting based on the change in scope (block 750). For example, client device 210 may set the second value for the scoped setting based on detecting a change in scope.

In some implementations, client device 210 may determine a relationship between two or more program blocks and may set the scoped setting based on the relationship. For example, client device 210 may determine that a first program block (e.g., a child program block, a grandchild program block, etc.) is subordinate to a second program block (e.g., a parent program block, a grandparent program block, etc.). In some implementations, a child program block may include a program block that is called/and or executed before a parent program block (e.g., a previous program block) finishes execution. For example, client device 210 may call a first function associated with a first program block, and may call a second function associated with a second program block before the first function has finished executing. Client device 210 may finish executing the second function and then, later in the execution of the program code, may finish executing the first function. In this instance, the second function may be a child of the first function.

In some implementations, client device 210 may set a default value for the scoped setting. The default value may apply to the program code and/or a portion of the program code when no value for the scoped setting is defined (e.g., by a user or in the program code). For example, a default value (e.g., a default value of "ceiling" for a rounding scoped setting) may apply to all program blocks associated with functions in the program code, unless a local setting (e.g., a scoped rounding setting) applies to a particular program block associated with a particular function.

In some implementations, client device 210 may add a scoped setting. For example, client device 210 may add a scoped setting that controls a program block. Additionally, or alternatively, client device 210 may remove a scoped setting. For example, client device 210 may stop a scoped setting from controlling the program block.

In some implementations, client device 210 may inherit a scoped setting from a previous program block. For example, a first program block (e.g., a parent program block) may be controlled by a first scoped setting. A second program block (e.g., a child program block) may be controlled by a second scoped setting. Client device 210 may set the second scoped setting to match the first scoped setting based on the relationship between the first program block and the second program block.

In some implementations, client device 210 may override a scoped setting. For example, client device 210 may detect that the first scoped setting (e.g., the wrap scoped setting) associated with the first program block (e.g., the first fixed-point function) differs from a second scoped setting (e.g., the saturate scoped setting) associated with the second program block (e.g., the second fixed-point function). Client device 210 may override the first scoped setting based on the second scoped setting.

In some implementations, client device 210 may reinstate a scoped setting. For example, client device 210 may reinstate an original scoped setting (e.g., the first scoped setting) when detecting that a subsequent program block (e.g., a third function) calls for the original scoped setting to be reinstated (e.g., client device 210 may change the saturate scoped setting back to the wrap scoped setting for the subsequent program block).

In some implementations, client device 210 may set the scoped settings using a stack. The stack may include a call stack, an execution stack, a control stack, a run-time stack, a machine stack, or the like. In some implementations, the stack may include a collection of information (e.g., a data structure) in which the principal operations on the collection are the addition of an entity (e.g., a scoped setting) to the collection (e.g., push) and the removal of an entity from the collection (e.g., pop). A new scoped setting may be added (e.g., pushed) to the top of the stack. When the scoped setting is out of scope (e.g., no longer controls the portion of program code) the scoped setting may be removed (e.g., popped) from the stack. Previous scoped settings may be reinstated, and/or may be added back into the stack.

While a series of blocks has been described with regard to FIG. 7, the blocks and/or the order of the blocks may be modified in some implementations. Additionally, or alternatively, non-dependent blocks may be performed in parallel.

Figure 8:
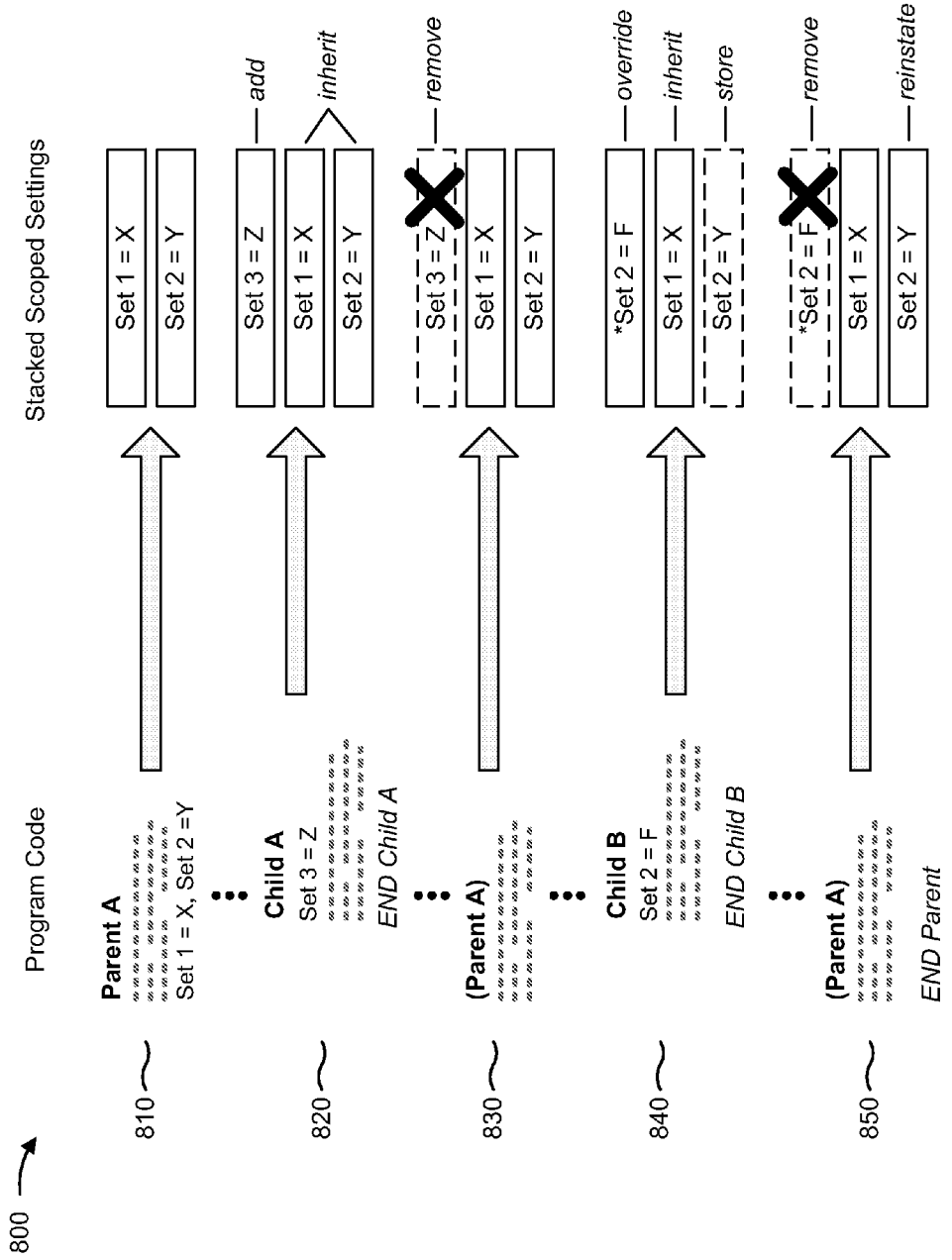
FIGS. 8, 9, 10A, and 10B are diagrams of example implementations relating to the example process shown in FIG. 7.

FIG. 8 is a diagram of example implementation 800 relating to example process 700 shown in FIG. 7. In example implementation 800, client device 210 may set scoped settings based on a relationship between program blocks.

As shown in FIG. 8, program code may include a quantity of program blocks and corresponding scoped settings. In some implementations, the scoped settings may be stored in a stack. As shown by reference number 810, the program code may include a parent program block, shown as "Parent A." Parent A may include a subset of program code that may include one or more projects, files, functions, subroutines, code sections, operations, lines of code, or the like. Parent A may add a first scoped setting (e.g., "Set 1=X") and a second scoped setting (e.g., "Set 2=Y"). The two scoped settings may be represented in the stack.

As shown by reference number 820, the parent program block may include a first child program block, shown as "Child A." Based on the relationship between Parent A and Child A (e.g., that Child A is a child of Parent A), Child A may inherit the first scoped setting (e.g., "Set 1=X") and the second scoped setting (e.g., "Set 2=Y") from Parent A. The inherited scoped settings may be added to and/or remain in the stack. Additionally, Child A may add a third scoped setting (e.g., "Set 3=Z") that applies to Child A. The third scoped setting may be added to the stack.

As shown by reference number 830, upon finishing the execution of Child A, the third scoped setting associated with Child A (e.g., "Set 3=Z") may be removed from the stack. Parent A may continue to execute program code associated with Parent A. The two scoped settings set by Parent A (e.g., "Set 1=X," and "Set 2=Y") may remain in the stack and continue to apply to Parent A.

As shown by reference number 840, Parent A may include a second child program block, shown as "Child B." Child B may inherit the first scoped setting (e.g., "Set 1=X") from Parent A. Additionally, Child B may override the second scoped setting (e.g., "Set 2=Y") by defining a new scoped value (e.g., "*Set 2=F") for the second scoped setting. The original scoped value (e.g., "Y") associated with the second scoped setting (e.g., "Set 2=Y") may be stored in the stack.

As shown by reference number 850, upon finishing the execution of Child B, the new scoped value (e.g., "*Set 2=F") may be removed from the stack. The original scoped value (e.g., "Set 2=Y") may be reinstated. The reinstated scoped value may continue to apply for the remaining execution of Parent A. When execution of Parent A ends, the first scoped setting and the second scoped setting may be removed from the stack.

Figure 9:
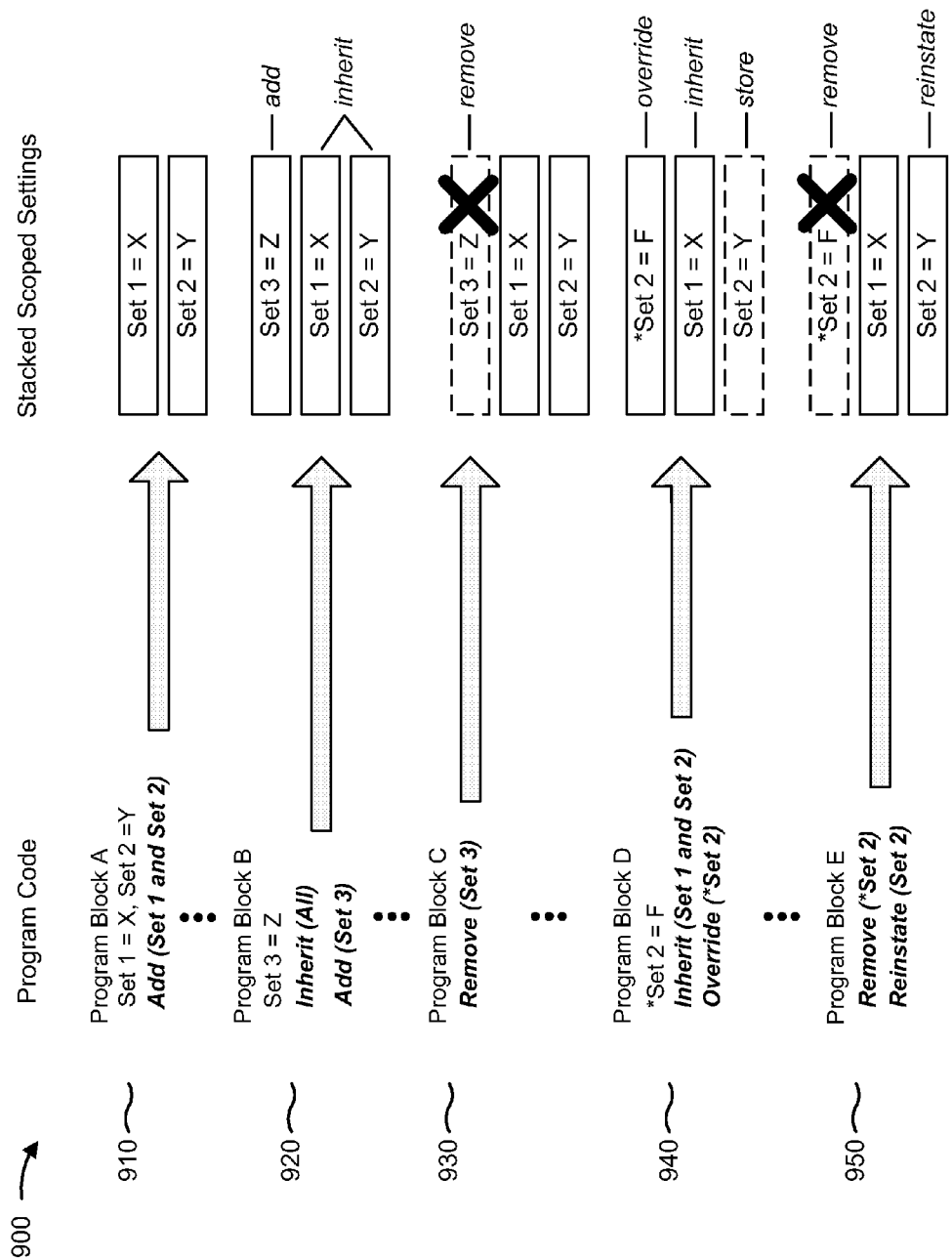

FIG. 9 is a diagram of another example implementation 900 relating to example process 700 shown in FIG. 7. In example implementation 900, client device 210 may set scoped settings based on commands in the program code.

As shown in FIG. 9, program code may include a quantity of program blocks and corresponding scoped settings. In some implementations, the scoped settings may be stored in a stack. As shown by reference number 910, a first program block, shown as "Program Block A," may include a first scoped setting (e.g., "Set 1=X") and a second scoped setting (e.g., "Set 2=Y"). Program Block A may include an add command (e.g., "Add (Set 1 and Set 2)") that causes the first scoped setting and the second scoped setting to be added to the stack.

As shown by reference number 920, a later section of the program code may include a second program block, shown as "Program Block B." Program Block B may include a third scoped setting (e.g., "Set 3=Z"). Program Block B may include an inherit command (e.g., "Inherit(All)") that causes all of the scoped settings from Program Block A to be added to the stack and applied to Program Block B. Program Block B may also include an add command (e.g., "Add(Set 3)") that causes the third scoped setting to be added to the stack and applied to Program Block B.

As shown by reference number 930, a later section of program code may include a third program block, shown as "Program Block C." Program Block C may include a remove command (e.g., "Remove (Set 3)") that cause the third scoped setting to be removed from the stack. Program Block C may continue to execute with only the remaining stacked scoped settings (e.g., "Set 1=X," and "Set 2=Y") applying to Program Block C.

As shown by reference number 940, a later section of program code may include a fourth program block, shown as "Program Block D." Program Block D may include a new scoped value associated with the second scoped setting (e.g., "*Set 2=F"). Program Block D may include an inherit command (e.g., "Inherit (Set 1 and Set 2)") and an override command (e.g., "Override (*Set 2)") that cause the first scoped setting and the second scoped setting to be added to the stack and applied to Program Block D, and to override a value associated with the second scoped setting (e.g., to change the second scoped setting from "Set 2=Y" to "*Set 2=F").

As shown by reference number 950, a later section of program code may include a fifth program block, as shown as "Program Block E." Program Block E may include a remove command (e.g., "Remove (*Set 2)") and a reinstate command (e.g., "Reinstate (Set 2)"). The remove and reinstate commands may cause the program code to remove the added scoped value (e.g., "F") associated with the second scoped setting and reinstate the original scoped value (e.g., "Y") associated with the second scoped setting (e.g., change the second scoped setting from "*Set 2=F" back to "Set 2=Y").

Figure 10A:
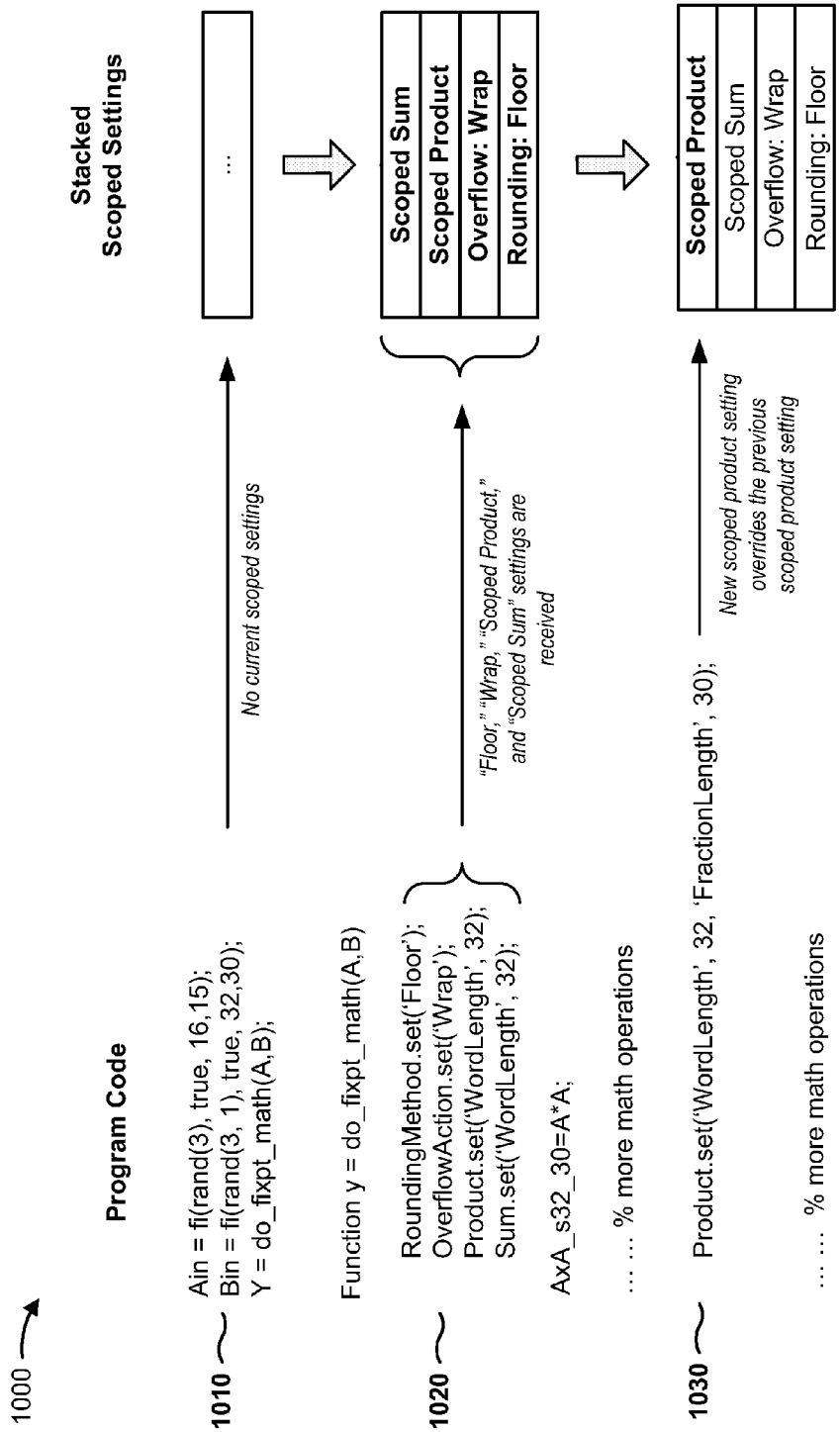
Figure 10B:
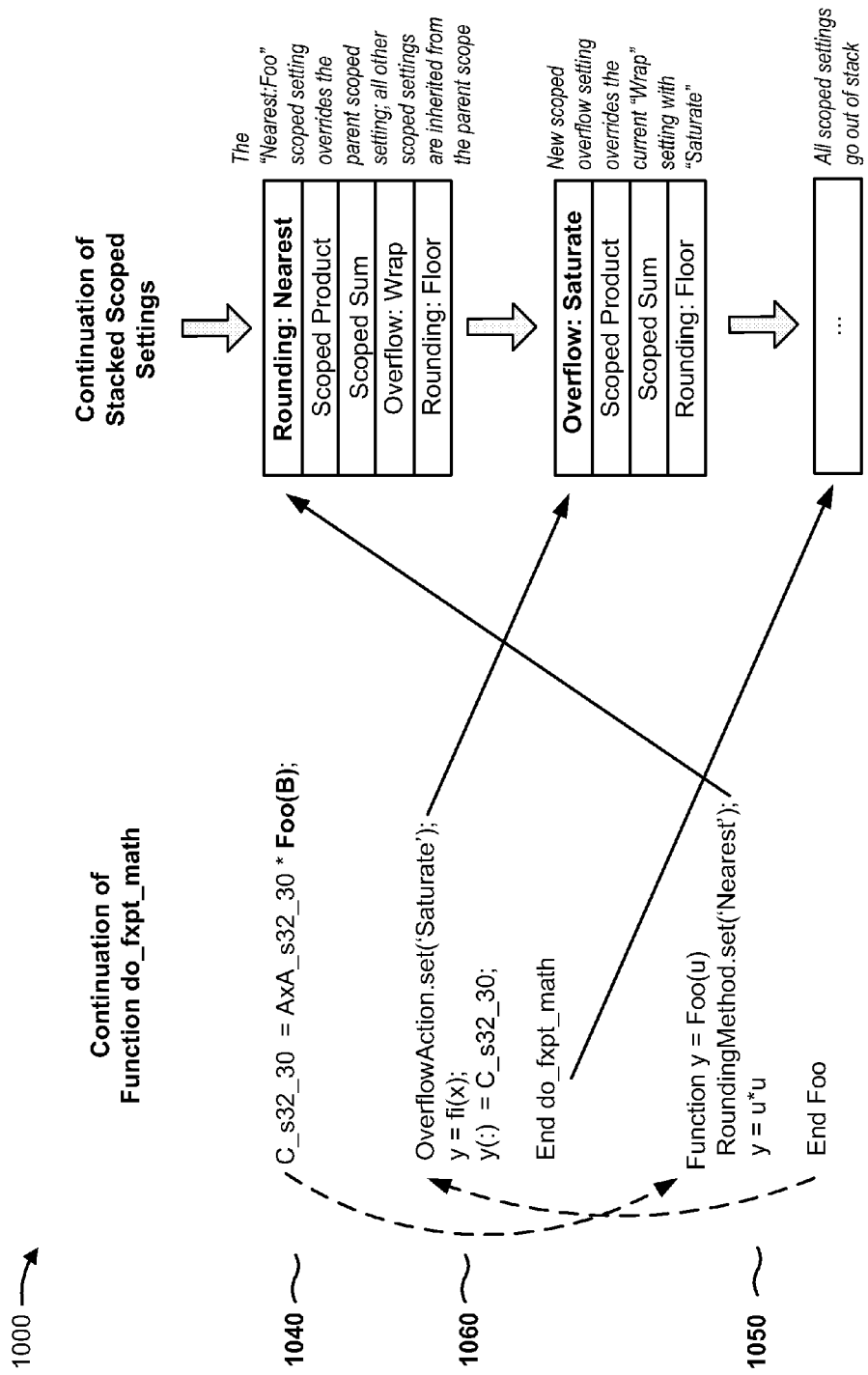

FIGS. 10A and 10B are diagrams of yet another example implementation 1000 relating to example process 700 shown in FIG. 7. In example implementation 1000, client device 210 may set scoped settings for one or more program blocks. For example, the program blocks may be displayed as program code and corresponding scoped settings in a stack.

FIG. 10A is a set of program blocks and associated scoped settings. As shown by reference number 1010, the program code may include initial inputs (e.g., "A" and "B"). The initial inputs may apply globally across the entire program code. The initial inputs may have no scoped settings (e.g., local settings) associated with the initial inputs.

As shown by reference number 1020, the program code may include a first function:

Function y=do_fxpt_math(A,B).

The first function may operate on the inputs (e.g., "A" and "B"). The program code may define several settings (e.g., scoped settings) to apply to the first function:

RoundingMethod.set('Floor');
OverflowAction.set('Wrap');
Product.set('WordLength', 32);
Sum.set('WordLength', 32).

The several settings may be placed (e.g., pushed) into a stack (e.g., a call stack) in the order dictated by program code (e.g., "Rounding: Floor," then "Overflow: Wrap," then "Scoped Product," then "Scoped Sum").

As shown by reference number 1030, the program code may execute additional math operations, and may define a new value:

Product.set('WordLength', 32, 'FractionLength', 30)

corresponding to a new scoped product setting (e.g., a scoped product setting specifying a word length of "32" and a fraction length of "30") associated with the first function. Thus, the new scoped product setting may override the previous scoped product setting.

FIG. 10B is a continuation of the program blocks and associated scoped settings shown in FIG. 10A. As shown by reference number 1040, the program code may include a second function:

Foo (B)

that is a child of the first function (e.g., a child of "Function y=do_fxpt_math(A,B)"). As shown by reference number 1050, the second function may inherit, from the first function, scoped settings associated with the first function (e.g., "Scoped Product," "Scoped Sum," "Overflow: Wrap," and "Rounding: Floor"). Additionally, the second function may define a new value:

RoundingMethod.set ('Nearest)

corresponding to a new scoped setting (e.g., "Rounding: Nearest") that overrides a parent scoped setting. When the execution of the second function ends, the new scoped value (e.g., "Rounding: Nearest") may be removed from the stack, and the stack may consist of "Scoped Product," "Scoped Sum," "Overflow: Wrap," and "Rounding: Floor," as shown in connection with reference number 1030 (FIG. 10A).

As shown by reference number 1060, the program code may execute additional operations, and may define a new value:

OverflowAction.set('Saturate')

corresponding to a new scoped overflow setting (e.g., a scoped setting specifying that the overflow action is to saturate) associated with the first function. The new scoped overflow setting may be added (e.g., pushed) to the stack. Thus the new overflow scoped setting (e.g., "Overflow: Saturate") may override the previous scoped overflow setting (e.g., "Overflow: Wrap"). When the program code finishes executing, the scoped settings may be removed from the stack.

Implementations described herein may assist a user (e.g., a user of client device 210) to modify and configure scoped settings in text-based program code.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of program code.

Certain user interfaces have been described herein. In some implementations, the user interfaces may be customizable by a device. Additionally, or alternatively, the user interfaces may be pre-configured to standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
execute a first program block associated with program code;
set, based on executing the first program block, a first value of a scoped setting associated with the first program block,
the first value of the scoped setting controlling a manner in which a first algorithm, identified in the first program block, is performed during execution of the first program block,
the scoped setting including at least one of:
an overflow setting, or
a fraction length setting;
detect a change in scope of the program code,
the change in scope including execution of a second program block that is different from the first program block;
determine, based on detecting the change, a relationship between the first program block and the second program block,
the second program block being called by the first program block during execution of the first program block, execution of the program code returning to execution of the first program block after execution of the second program block; and
set a second value of the scoped setting based on the relationship,
the second value of the scoped setting controlling a manner in which a second algorithm, identified in the second program block, is performed during execution of the second program block.

2. The device of claim 1, where the first program block and the second program block include one or more fixed-point functions; and
where the overflow setting includes at least one of a wrap setting or saturation setting; and
where the scoped setting further includes at least one of:
a rounding setting,
a floor setting,
a ceiling setting,
a product setting, or
a word length setting.

3. The device of claim 1, where the first program block or the second program block includes at least one of:
a subroutine;
a plurality of files;
a single file;
a function;
a code section;
an operation; or
a line of program code.

4. The device of claim 1, where the one or more processors are further to:
receive information that identifies a portion of the program code associated with the scoped setting; and
where the one or more processors, when setting the second value of the scoped setting, are further to:
set the second value of the scoped setting based on the information that identifies the portion of the program code associated with the scoped setting.

5. The device of claim 1, where the one or more processors, when setting the second value of the scoped setting, are further to:
determine the first value of the scoped setting associated with the first program block; and
inherit the first value of the scoped setting for the second program block by setting the second value to the first value.

6. The device of claim 1, where the one or more processors are further to:
provide, via a user interface, a representation of a hierarchy of scoped settings including the scoped setting,
the hierarchy including information that identifies a scope of the scoped setting;
receive information that identifies a modification to the hierarchy; and
where the one or more processors, when setting the second value of the scoped setting, are further to:
set the second value of the scoped setting based on the modification to the hierarchy.

7. The device of claim 1, where the one or more processors, when setting the second value of the scoped setting, are further to:
set the second value of the scoped setting based on at least one of:
overriding the first value of the scoped setting;
adding a new value of the scoped setting;
removing the first value of the scoped setting; or
reinstating a previous value of the scoped setting.

8. A non-transitory computer-readable medium storing instructions, the instructions comprising:
a plurality of instructions that, when executed by one or more processors, cause the one or more processors to:
detect execution of a first subroutine associated with program code;
set, based on detecting execution of the first subroutine, a first value of a scoped setting associated with the first subroutine,
the first value of the scoped setting controlling a manner in which a first operation, identified in the first subroutine, is performed during execution of the first subroutine,
the scoped setting including one or more settings relating to one or more mathematical operations;
detect execution of a second subroutine associated with the program code,
the second subroutine differing from the first subroutine,
the second subroutine being called by the first subroutine,
execution of the program code returning to execution of the first subroutine after execution of the second subroutine; and
set, based on detecting execution of the second subroutine, a second value of the scoped setting based on a relationship between the first subroutine and the second subroutine,
the second value of the scoped setting controlling a manner in which a second operation, identified in the second subroutine, is performed during execution of the second subroutine.

9. The non-transitory computer-readable medium of claim 8, where the first subroutine and the second subroutine include one or more fixed-point functions; and
where the one or more settings, relating to one or more mathematical operations, include at least one of:
an overflow setting,
a wrap setting,
a saturation setting,
a fraction length setting,
a rounding setting,
a floor setting,
a ceiling setting,
a product setting, or
a word length setting.

10. The non-transitory computer-readable medium of claim 8, where the first subroutine or the second subroutine includes at least one of:
a plurality of files;
a single file;
a function;
a code section;
an operation; or
a line of program code.

11. The non-transitory computer-readable medium of claim 8, where one or more instructions, of the plurality of instructions, that cause the one or more processors to set the second value of the scoped setting, further cause the one or more processors to:
determine the first value of the scoped setting associated with the first subroutine; and
override the first value of the scoped setting for the second subroutine by setting the second value to a value other than the first value.

12. The non-transitory computer-readable medium of claim 11, where the relationship indicates that the second subroutine is a child of the first subroutine, and
where one or more instructions, of the plurality of instructions, further cause the one or more processors to:
detect that the second subroutine has finished executing;
detect execution of the first subroutine; and
reinstate the first value of the scoped setting based on detecting that the second subroutine has finished executing and detecting execution of the first subroutine.

13. The non-transitory computer-readable medium of claim 8, where one or more instructions, of the plurality of instructions, that cause the one or more processors to set the second value of the scoped setting, further cause the one or more processors to:
determine the first value of the scoped setting associated with the first subroutine; and
inherit the first value of the scoped setting for the second subroutine by setting the second value to the first value.

14. The non-transitory computer-readable medium of claim 8, where one or more instructions, of the plurality of instructions, further cause the one or more processors to:
provide, via a user interface, a representation of a hierarchy of scoped settings including the scoped setting,
the hierarchy including information that identifies a scope of the scoped setting,
the first subroutine being associated with the hierarchy of the scoped settings;
receive information that identifies a modification to the hierarchy;
set a value of another scoped setting, of the hierarchy of the scoped settings, based on the modification to the hierarchy; and
where one or more instructions, of the plurality of instructions, that cause the one or more processors to set the second value of the scoped setting, further cause the one or more processors to:
set the second value of the scoped setting based on the modification to the hierarchy.

15. A method, comprising:
executing a first portion of program code,
the executing the first portion of the program code being performed by a device;
setting, based on executing the first portion of the program code, a first value of a scoped setting associated with the first portion of the program code,
the first value of the scoped setting controlling a manner in which a first operation, identified in the first portion of the program code, is performed during execution of the first portion of the program code,
the scoped setting including at least one of:
an overflow setting, or
a fraction length setting,
the setting the first value of the scoped setting being performed by the device;
detecting a change in scope of the program code,
the change in scope including execution of a second portion of the program code that is different from the first portion of the program code,
the second portion of the program code being called by the first portion of the program code,
execution of the program code returning to execution of the first portion of the program code after execution of the second portion of the program code,
the detecting the change in scope being performed by the device; and
setting a second value of the scoped setting based on detecting the change,
the second value of the scoped setting controlling a manner in which a second operation, identified in the second portion of the program code, is performed during execution of the second portion of the program code,
the setting the second value of the scoped setting including:
setting the second value of the scoped setting based on at least one of:
removing the first value of the scoped setting, or
reinstating a previous value of the scoped setting,
the setting the second value of the scoped setting being performed by the device.

16. The method of claim 15, where the first portion of the program code and the second portion of the program code include one or more fixed-point functions; and
where the overflow setting includes at least one of a wrap setting or a saturation setting; and
where the scoped setting further includes at least one of:
a rounding setting,
a floor setting,
a ceiling setting,
a product setting, or
a word length setting.

17. The method of claim 15, where the first portion of the program code and the second portion of the program code include at least one of:
a plurality of files;
a single file;
a function;
a code section;
an operation; or
a line of program code.

18. The method of claim 15, where setting the second value of the scoped setting further comprises:
determining the first value of the scoped setting associated with the first portion of the program code; and
setting the second value to the first value based on detecting that the second portion of the program code is a child of the first portion of the program code.

19. The method of claim 15, further comprising:
providing, via a user interface, a representation of a hierarchy of scoped settings including the scoped setting,
the hierarchy including information that identifies a scope of the scoped setting;
receiving information that identifies a modification to the hierarchy; and
where setting the second value of the scoped setting further comprises:
setting the second value of the scoped setting based on the modification to the hierarchy.

20. The method of claim 15, where setting the second value of the scoped setting further comprises:
setting the second value of the scoped setting further based on at least one of:
overriding the first value of the scoped setting; or
adding a new value of the scoped setting.

* * * * *